(12) United States Patent
Harada et al.

(10) Patent No.: US 7,846,855 B2
(45) Date of Patent: Dec. 7, 2010

(54) NONWOVEN FABRICS AND LAMINATES MADE BY USING THE SAME

(75) Inventors: Toshimitsu Harada, Okayama (JP); Soichi Obata, Saijo (JP); Hideo Hayashi, Osaka (JP); Yasurou Araida, Osaka (JP); Tomoaki Kimura, Osaka (JP); Martin Steuer, Liederbach (DE)

(73) Assignees: Kuraray Co., Ltd., Kurashiki-shi (JP); Kuraray Europe GmbH, Frankfurt am Main (DE)

( * ) Notice: Subject to any disclaimer, the term of this patent is extended or adjusted under 35 U.S.C. 154(b) by 311 days.

(21) Appl. No.: 11/909,541

(22) PCT Filed: Mar. 23, 2006

(86) PCT No.: PCT/JP2006/305848
§ 371 (c)(1),
(2), (4) Date: Apr. 2, 2008

(87) PCT Pub. No.: WO2006/101175
PCT Pub. Date: Sep. 28, 2006

(65) Prior Publication Data
US 2009/0068914 A1 Mar. 12, 2009

(30) Foreign Application Priority Data
Mar. 24, 2005 (JP) .............................. 2005-085805

(51) Int. Cl.
*D04H 1/00* (2006.01)
*D04H 13/00* (2006.01)

(52) U.S. Cl. ...................... 442/327; 442/361; 442/381; 442/400; 442/401; 428/365; 428/373

(58) Field of Classification Search ................. 442/361, 442/381, 400, 401, 327; 428/365, 373
See application file for complete search history.

(56) References Cited

U.S. PATENT DOCUMENTS 3,855,055 A * 12/1974 Kanno et al. ................. 428/437
2005/0045296 A1 * 3/2005 Adam et al. ............. 162/157.6

FOREIGN PATENT DOCUMENTS

| JP | 1 260010 | 10/1989 |
|---|---|---|
| JP | 3 167306 | 7/1991 |
| JP | 3 254937 | 11/1991 |
| JP | 8 58003 | 3/1996 |
| JP | 10 716 | 1/1998 |
| JP | 11 116822 | 4/1999 |

* cited by examiner

*Primary Examiner*—Norca L Torres-Velazquez
(74) *Attorney, Agent, or Firm*—Oblon, Spivak, McClelland, Maier & Neustadt, L.L.P.

(57) ABSTRACT

A nonwoven fabric containing a polyvinyl butyral fiber is provided. In particular, continuous fiber nonwoven fabrics, such as a melt-blown nonwoven fabric and a spunbonded nonwoven fabric, are preferred. By laminating a plurality of layers via an adhering layer made of such a nonwoven fabric and then heating, a laminate is obtained by a simple process. In particular, an interior material in which an inorganic fiber layer, a foam layer and a surface material layer are adhered together via the aforementioned type of adhering layers is a desirable embodiment. Such an interior material is excellent in rigidity, sound absorbency and thermal deformation resistance, and therefore is useful as an interior material to be used for cars, railway vehicles, vessels, and the like.

10 Claims, 1 Drawing Sheet

NONWOVEN FABRICS AND LAMINATES MADE BY USING THE SAME

TECHNICAL FIELD

The present invention relates to a nonwoven fabric comprising a polyvinyl butyral fiber. In particular, it relates to a nonwoven fabric which is lightweight and excellent in both sound absorbency and damping property and which can be used suitably as a binder of a skin layer or cushion layer of a molded interior material for cars, railway vehicles and vessels. The invention also relates to a laminate using such nonwoven fabric and to an interior material comprising such laminate.

BACKGROUND ART

Laminates including a glass fiber layer are known as interior materials or acoustic materials for cars, railway vehicles or vessels (see, for example, Patent Document 1). The laminate disclosed in Patent Document 1 has a layered structure shown in FIG. 2, namely, a structure in which glass fiber layers 2, 3 and surface material layers 4, 5 are disposed and adhered on both sides of a foam layer 1 of a polyurethane foam and shaped into a predetermined shape. For adhering and integrating the layers and fixing the shape, the following methods have been adopted; for example, a method in which a powder of a polyethylene resin or polypropylene resin is dispersed in the glass fiber layers 2, 3 and then the layers are held and pressed between molds while being heated at a temperature of about 170° C., so that the resin powder is melted, and then the melted resin is cooled to solidify; a method in which a liquid adhesive such as an isocyanate resin is sprayed to an adhered side of the foam 1; a method in which a resin layer which will serve as a binder is formed by transfer or the like; and a method in which a hot-melt sheet is heated and adhered with a calender or a thermal adhesion machine.

However, the aforementioned methods are not so desirable from the viewpoint of an environmental pollution problem and energy saving because it is necessary to conduct high-temperature or long-time heat treatment for the purpose of drying or welding of the resin. Hot-melt sheets or the like can be adhered only by pressuring at a high temperature of 170° C. or more and a high pressure of 0.5 kg/cm$^2$ or more. Particularly, in adhering of a polyurethane-based hot-melt sheet, operations become complicated because the adhesion needs moisture and can not be achieved fully by only the moisture in the air, leading to require a step of supplying moisture. In addition, although the reaction starts on the absorption of moisture, the reaction will have not been completed when fixing by thermal adhesion is completed because it requires about 24 hours to complete the reaction. In the adhesion using such a binder resin, high-temperature and high-pressure adhesion will cause the resin to form a film at an interface between nonwoven fabrics and will reduce the thickness of a structure. Therefore, it has some problems such as deterioration in rigidity and sound absorbency.

A method is also known which uses, as an adhering layer, a spider web-like sheet obtained by spunbonding using a modified polyester fiber as a raw material instead of the binder resin or the urethane-based hot-melt sheet (see, for example, Patent Document 2). It, however, is problematic in that a high pressure of 0.5 kg/cm$^2$ or more and a high temperature of 140° C. or more are required as adhering conditions in use of that sheet as an adhering layer and the failure to satisfy these conditions will lead to low adhesiveness to cause delamination of a laminate after molding.

Patent Document 1: JP 10-000716 A

Patent Document 2: JP 8-58003 A

DISCLOSURE OF THE INVENTION

Problems to be Solved by the Invention

The present invention was made in order to solve the problems mentioned above. An object of the present invention is to provide a nonwoven fabric which can be suitably used for the production of a laminate and which can simplify a thermal adhesion process and can be adhered even under low-pressure and low-temperature conditions. Another object is to provide a laminate excellent in rigidity, sound absorbency and the like obtained by using such a nonwoven fabric and an interior material including the laminate.

Means for Solving the Problems

The present inventors studied earnestly for achieving the aforementioned objects. As a result, use of a nonwoven fabric comprising polyvinyl butyral (in the following, sometimes referred to as PVB) as an adhering layer made it possible to simplify the adhering step during the production of laminates such as an automotive interior material and to achieve adhesion at a saved energy (low temperature and low pressure). They also found that laminates thus obtained will hold their thickness when being fabricated into structures such as interior materials and ceiling materials and are excellent in rigidity, sound absorbency and thermal deformation resistance. Thus, they accomplished the present invention.

The present invention is directed to a nonwoven fabric comprising a polyvinyl butyral fiber. It is desirable that the polyvinyl butyral fiber comprises polyvinyl butyral having a degree of butyralization of 50 to 90 mass % and an MFR, measured at 150° C. and 2.16 kgf, of 0.5 to 45 g/10 min. It is desirable that the polyvinyl butyral fiber is composed of a single-component fiber made only of polyvinyl butyral, a conjugate fiber comprising polyvinyl butyral as a component, or a mixed fiber comprising polyvinyl butyral as a component. It is also desirable that the polyvinyl butyral fiber is a continuous fiber, and specifically, it is desirably in the form of a melt-blown nonwoven fabric having a weight of 1 to 100 g/m$^2$ or a spunbonded nonwoven fabric having a weight of 5 to 200 g/m$^2$.

The present invention is directed also to a laminate comprising a plurality of layers, wherein each of the layers is adhered to another via an adhering layer composed of the aforementioned nonwoven fabric of the polyvinyl butyral fiber. At this time, it is desirable that an inorganic fiber layer and another layer are adhered together via the adhering layer, and it is more desirable that the inorganic fiber layer is a glass fiber layer. It is also desirable that the inorganic fiber layer, a foam layer and a surface material layer are adhered together via the adhering layer. One preferable embodiment of the laminate of the present invention is an interior material. A more preferable embodiment is a laminate for interior materials, wherein a glass fiber layer, a foam layer and a cloth layer are adhered and integrated via the continuous fiber nonwoven fabric.

Effect of the Invention

By use of the present invention, it is possible to provide a nonwoven fabric which can be used suitably in the production of laminates and which can simplify a thermal adhesion step and can result in adhesion under low-pressure and low-temperature conditions. For example, since it can be adhered under conditions of 0.5 kg/cm² or lower and 140° C. or lower, it can contribute to energy saving. Further, a laminate obtained therefrom is suitable as an interior material because it secures a certain thickness of a structure and it is excellent in rigidity, sound absorbency and thermal deformation resistance.

EXPLANATION OF REFERENTIAL NUMERALS

Figure 1:
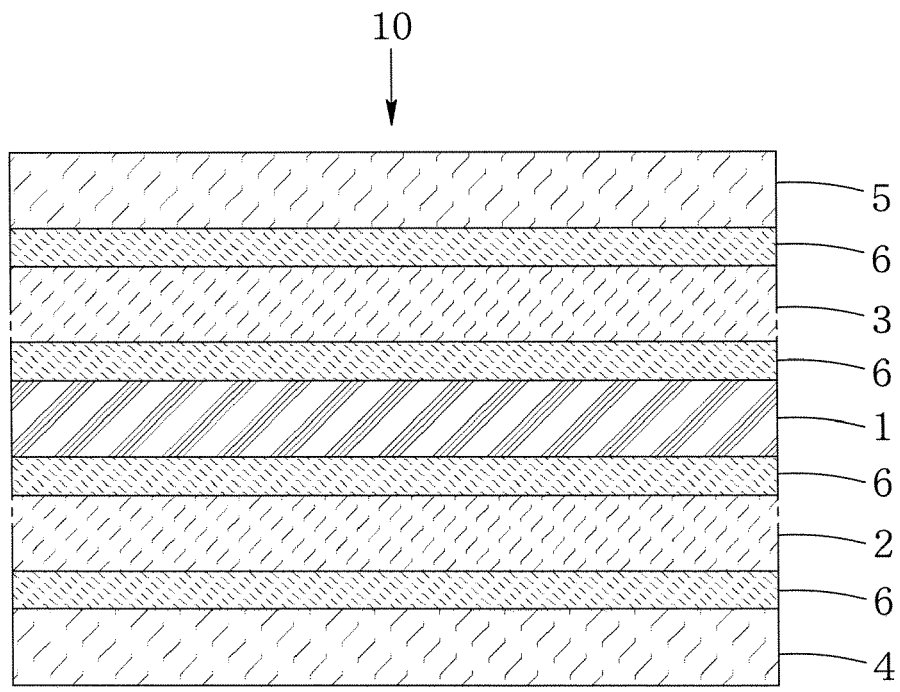
FIG. 1 is a sectional view showing one example of an interior material using nonwoven fabrics as adhering layers.

1 Foam layer
2, 3 Glass fiber layer
4, 5 Surface material layer
6 Adhering layer composed of nonwoven fabric
7 Adhering layer composed of hot-melt polyurethane sheet
8 Adhering layer composed of isocyanate resin
10, 20 Interior material

BEST MODE FOR CARRYING OUT THE INVENTION

The present invention is described in detail below. The polyvinyl butyral (PVB) used in the present invention is represented by the following chemical formula (I):

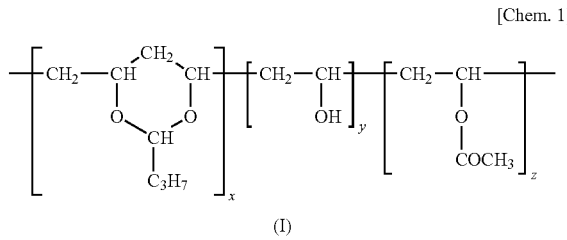

[Chem. 1]

(I)

In the PVB used in the present invention, a degree of butyralization is expressed by the content of a repeating unit X in the polymer composition represented by the chemical formula (I). Specifically, in the present invention, it is preferable to use a PVB having a degree of butyralization of from 50 to 90 mass %, more preferably from 55 to 85 mass %. When the degree of butyralization is less than 50 mass %, the resin comes to have an increased glass transition temperature, a decreased fluidity and a reduced thermal adhesion property. On the other hand, when the degree of butyralization is greater than 90 mass %, the resin at the adhered interface comes to have reduced strength, resulting in reduced rigidity when being molded into a laminate.

A melt flow rate (MFR) of the PVB used in the present invention is preferably from 0.5 to 45 g/10 min. When the MFR is less than 0.5 g/10 min, the PVB has a low fluidity and it is difficult to be processed into a continuous fiber nonwoven fabric. On the other hand, when the MFR is higher than 45 g/10 min, the fluidity is high. However, the strength as a fiber is low and the use thereof as a nonwoven fabric becomes difficult. The MFR is more preferably from 1 to 40 g/10 min. The MFR as used herein is measured in accordance with the JIS K7210 testing method and it is indicated by the quantity of a polymer discharged in 10 minutes when the polymer molten at 150° C. is extruded through a capillary at a load of 2.16 kgf.

The PVB fiber used in the nonwoven fabric of the present invention may be a single-component fiber made only of PVB or may be a conjugate fiber or a mixed fiber comprising PVB and other thermoplastic polymers. A nonwoven fabric which contains PVB as a component, in particular, a continuous fiber nonwoven fabric is available. Examples of the conjugate fiber include sheath-core type conjugate fibers in which PVB is used as a component of the sheath and another thermoplastic polymer is used as a component of the core, and separate type conjugate fibers in which PVB and another thermoplastic polymer are laminated together.

The type of the nonwoven fabric for use in the present invention is not specifically restricted. For example, a nonwoven fabric prepared by entangling staple fibers may be used. A continuous fiber nonwoven fabric may also be used. For entangling staple fibers, methods such as needle punching and water jetting can be used.

There, however, is no need to take into consideration the strength of a single fiber necessary for web formation in, for example, a carding step. Therefore, a continuous fiber nonwoven fabric is suitably used in the present invention. The form of the continuous fiber nonwoven fabric is not particularly restricted and examples thereof include a spunbonded nonwoven fabric and a melt-blown nonwoven fabric. However, a melt-blown nonwoven fabric, whose fineness can be reduced and which can be produced directly after melt extrusion, is particularly preferred.

The following is a concrete description about the case of producing a melt-blown nonwoven fabric. In the case of producing a melt-blown nonwoven fabric of PVB, it is desirable to dry the PVB in advance to a water content of 5000 ppm or less. When the water content is higher than 5000 ppm, it will become difficult to produce a continuous fiber nonwoven fabric. The water content is more preferably 1000 ppm or less, and even more preferably 500 ppm or less. The processing temperature in the production of a nonwoven fabric is preferably from 200 to 280° C. When it is lower than 200° C., the polymer has too high a viscosity to be processed into fibers and it becomes difficult to produce fine fibers with hot air. On the other hand, when it exceeds 280° C., the polymer is thermally decomposed to have a reduced viscosity and therefore it becomes difficult to produce a continuous fiber nonwoven fabric.

The weight of the melt-blown nonwoven fabric used as the continuous fiber nonwoven fabric of the present invention is preferably from 1 to 100 g/m². In the case where the weight is less than 1 g/m², even when the nonwoven fabric is thermally melted and adhered to a material such as a glass fiber layer, it is adhered at few points, resulting in an insufficient adhesion strength. On the other hand, in the case where it exceeds 100 g/m², in heating and adhering the nonwoven fabric, the heat is hardly transferred thereto, resulting in a reduced adhesion strength. The weight is more preferably from 5 to 50 g/m², and even more preferably from 10 to 30 g/m². The fiber diameter, which may be controlled appropriately depending on the application, is preferably from 0.5 to 40 μm, and more preferably from 3 to 20 μm in view of the workability, strength of the nonwoven fabric and adhering performance.

The spunbonded nonwoven fabric to be used as the continuous fiber nonwoven fabric of the present invention preferably has a weight of from 5 to 200 g/m². When the weight is less than 5 g/m², the texture is too coarse, resulting in a reduced adhesion strength. On the other hand, when the weight is greater than 200 g/m², in heating and adhering the nonwoven fabric, the heat is hardly transferred thereto, resulting in a reduced adhesion strength. The weight is more preferably from 10 to 150 g/m², and even more preferably from 20 to 100 g/m². The fiber diameter in a spunbonded nonwoven fabric, which may be controlled appropriately depending on the application, is preferably from 5 to 50 μm, and more preferably from 20 to 40 μm in view of the strength of the nonwoven fabric and adhering performance. The sectional shape of the fiber is not particularly restricted.

In the present invention, laminates, especially laminates for interior materials, can be obtained by use of a nonwoven fabric, especially a continuous fiber nonwoven fabric, produced by the method described above, as an adhering layer. That is, a preferred embodiment of the present invention is a laminate comprising a plurality of layers, wherein each of the layers is adhered to another via an adhering layer comprising a nonwoven fabric of the PVB fiber. By heating a plurality of layers while interposing the aforementioned type of nonwoven fabrics therebetween, it is possible to melt the PVB fiber to adhere the plurality of layers each other. In this operation, it is preferable to apply pressure and heat simultaneously.

The type of the plurality of layers interposed with the adhering layer is not particularly restricted, but it is preferable that an inorganic fiber layer and another layer is adhered together via the adhering layer. This is because PVB exhibits good adhesiveness to inorganic fibers. The type of the inorganic fiber layer used here is not particularly restricted. Although a carbon fiber layer or a metal fiber layer can be used, a glass fiber layer is preferred from the viewpoint of versatility.

A particularly preferred embodiment of the laminate of the present invention is a laminate in which the inorganic fiber layer, a foam layer and a surface material layer are adhered together via the adhering layer. A particularly preferred application of the laminate of the present invention is an interior material.

As an example, an interior material in which a glass fiber layer, a foam layer and a surface material layer are adhered together via the aforementioned adhering layers will be described below. FIG. 1 is a sectional view showing an example of an interior material for vehicles, which is a typical application of the present invention.

An interior material 10 is a product fabricated by disposing glass fiber layers 2, 3 and surface material layers 4, 5 on both sides of a foam layer 1, and then adhering and integrating them into a desired product shape such as a ceiling material. The adhering of the layers and the shape fixation are achieved by melt-adhering of adhering layers 6 composed of the continuous fiber nonwoven fabric of the present invention each intervening between the foam layer 1 and the adjacent glass fiber layers 2, 3 and between the glass fiber layers 2, 3 and the surface material layers 4, 5. The interior material 10, whose production method will be described later, can be obtained by disposing and laminating the continuous fiber nonwoven fabrics of the present invention between the surface material layers 4, 5 and the glass fiber layers 2, 3 and between the glass fiber layers 2, 3 and the foam layer 1, and then heat pressing them.

A density of the continuous fiber nonwoven fabrics disposed and laminated between the glass fiber layers 2, 3 and the foam layer 1 or between the glass fiber layers 2, 3 and the surface material layers 4, 5 is preferably from 0.005 to 0.4 g/cm³ from the viewpoint of bulkiness. Too low a density of a nonwoven fabric will disadvantageously lead to poor shape stability. Conversely, when the density is greater than 0.4 g/cm³, the bulkiness is poor and the sound absorbency, which is an object of the present invention, will deteriorate. The density is more preferably from 0.01 to 0.3 g/cm³.

In the interior material 10, the foam layer 1 is a sheet-shaped material which forms the core of the interior material 10. Various materials such as a semi-hard or hard polyurethane foam can be used. The thickness of the foam layer 1 is determined properly depending, for example, on the type of the desired interior material 10 for vehicles.

The glass fiber layers 2, 3 are laminated and adhered on both sides of the foam layer 1 for improving the rigidity of the interior material 10. As the glass fiber layers 2, 3, materials formed in advance in a mat shape, materials shaped in a layer form through accumulation of glass fibers having a predetermined length during the production of the interior material 10, and the like may be used after being properly selected. The thickness of the glass fiber layers 2, 3, the fiber length of the glass fiber, and the weight of the glass fiber layers may be determined properly depending on the application or shape of the interior material 10.

The surface material layers 4, 5 are provided on the outer surfaces of the glass fiber layers 2, 3 for internal protection or decoration of the interior material 10. One surface material layer 5 forms the rear surface of the interior material 10 and the other surface material layer 4 forms the front surface. As the surface material layers 4, 5, for example, materials composed solely of a nonwoven fabric, synthetic leather, a plastic film or the like, or materials in which a plastic film is laminated on a foam may be properly used. Of course, it is not necessary to form the surface material layer 4 and the surface material layer 5 from the same material.

As described above, by adhering the glass fiber layers 2, 3 to the foam layer 1, or the glass fiber layers 2, 3 to the surface material layers 4, 5 by use of the adhering layer 6 composed of the continuous fiber nonwoven fabric of the present invention, a product which hardly produces delamination at an interface and which has excellent sound absorbency can be obtained. On the other hand, adhering using, for example, an adhesive film is undesirable because it will result in poor air permeability and it may cause deterioration in sound absorptivity.

Using the nonwoven fabric of the present invention enables the adhering step in molding of a laminate such as interior materials for vehicles to be simplified. Further, it can be adhered at saved energy (low temperature and low pressure) in such an adhering step. A thus-obtained laminate can secure a thickness of a structure as an interior material or ceiling material and is excellent in rigidity, sound absorbency and thermal deformation resistance.

EXAMPLES

The present invention will be described more concretely below with reference to Examples, but the invention is not limited to these Examples. The physical property values in the Examples mean values measured by the following methods.

[Weight of Nonwoven Fabric (g/m²)]

The measurement is performed in accordance with JIS P8124.

[Thickness (mm) of Nonwoven Fabric, Density (g/m³) of Nonwoven Fabric]

After a resulting continuous fiber nonwoven fabric is left at rest for 4 hours or more under a standard environment (a temperature of 20° C., a relative humidity of 65%), the thickness thereof is measured at five points using a PEACOCK Dial-Thickness Gauge H Type (produced by Yasuda-Seiki-Seisakusho, LTD.; φ10 mm×180 g/cm²) and the average of the measurements is expressed as the thickness of the nonwoven fabric. The density is calculated by dividing the weight by the thickness.

[Thickness (mm) of Interior Material (Laminate), Density (g/m$^3$) of Interior Material (Laminate)]

After an interior material (laminate) after its molding is left at rest for 4 hours or more under the standard environment (a temperature of 20° C., a relative humidity of 65%), the thickness thereof is measured at five points using a PEACOCK MODEL PDN12 (produced by Yasuda-Seiki-Seisakusho, LTD.; 416 mm×550 g/cm$^2$) and the average of the measurements is expressed as the thickness of the interior material (laminate). The density is calculated by dividing the weight of the interior material (laminate) by its thickness.

[Peeling Strength (Adhesion Strength) (N/15 mm)]

In an interior material 10 after molding shown in FIG. 1, a laminate is cut to have a width of 15 mm. Using 5543 produced by Instron, a foam layer 1 (urethane foam) and a glass fiber layer 2 in the interior material 10 (laminate) are clipped with chucks at the ends of the layers where the specimen is to be torn. The peeling strength between the layers is measured at a testing speed of 100 mm/min.

[Flexural Modulus Gradient (N/50 mm/cm), Maximum Bending Load (N/50 mm)]

A sample (50 mm in width and 150 mm in length) of an interior material (laminate) after molding is placed on a sample table (tip R5×50 mm in width; pitch 100 mm). Then, the center of the interior material (laminate) sample (the vicinity of the center of the pitch of the sample table) is pressed from above with a sample presser (tip R5×50 mm in width) having a shape similar to that of the sample table at a pressing rate of 50 mm/min. On a chart produced, a straight line is drawn along an initial slope. A load (N) is read and it is used as a flexural modulus gradient. Further, a maximum load (N) is read from the chart produced and it is used as a maximum bending load.

[Degree of Sound Absorption (%)]

In accordance with JIS A1405, a degree of sound absorption by the vertical incidence method is measured. An average of the degrees of sound absorption at 1000 Hz and 2000 Hz is used as a representative value.

[Overall Judgment]

In a molding step (thermal adhesion), a case where a peeling strength of 0.05 N/15 mm or more, a degree of sound absorption of 60% or more, a flexural modulus gradient of 55 N/50 mm/cm or more, and a maximum bending load of 17.0 N/50 mm or more are all satisfied is rated as A and a case where at least one of the aforementioned property values is not satisfied is rated as B.

Example 1

A melt-blown nonwoven fabric having a weight of 30.0 g/m$^2$ and a thickness of 0.448 mm was obtained by use of PVB having a degree of butyralization of 77 mass % and an MFR of 6 g/10 min. Using the resulting melt-blown nonwoven fabric as an adhering layer 6 as shown in FIG. 1, layers are laminated. As the foam layer 1, a polyether-type hard urethane foam having a weight of 180 g/m$^2$ and a thickness of 6 mm (produced by Inoac Corporation) was used. As a glass fiber layer 3, a material having a weight of 100 g/m$^2$ and a thickness of 20 mm (produced by Japan Vilene Co., Ltd.) was used. As a surface material layer 5 constituting the rear surface of the interior material 10, a polyester fiber nonwoven fabric having a weight of 25 g/m$^2$ was used. As a surface material layer 4 constituting the front surface of the interior material 10, a polyester fiber nonwoven fabric having a weight of 220 g/m$^2$ was used. The interior material 10 was obtained by laminating these materials and conducting press molding under press conditions: a press temperature of 130° C., a press time of 30 seconds and a pressure of 0.3 kg/cm$^2$. The results of the performance measurements of the interior material 10 obtained are shown in Table 1.

Example 2

A melt-blown nonwoven fabric having a weight of 25.0 g/m$^2$ and a thickness of 0.420 mm was obtained by use of the same PVB as Example 1. Using the resulting melt-blown nonwoven fabric as the adhering layer 6 as shown in FIG. 1, an interior material 10 was obtained by conducting press molding under the same composition and conditions as Example 1. The results of the performance measurements of the interior material 10 obtained are shown in Table 1.

Example 3

Using PVB having a degree of butyralization of 82 mass % and an MFR of 27.1 g/10 min and using a melt-blown nonwoven fabric having a weight of 30.0 g/m$^2$ and a thickness of 0.438 mm as the adhering layer 6 as shown in FIG. 1, an interior material 10 was obtained by conducting press molding under the same composition and conditions as Example 1. The results of the performance measurements of the interior material 10 obtained are shown in Table 1.

Example 4

A spunbonded nonwoven fabric having a weight of 31.2 g/m$^2$ and a thickness of 0.451 mm was obtained by use of PVB having a degree of butyralization of 72 mass % and an MFR of 7.0 g/10 min. Using the resulting spunbonded nonwoven fabric as the adhering layer 6 as shown in FIG. 1, layers are laminated with the same composition as Example 1. An interior material 10 was obtained by conducting press molding under press conditions: a press temperature of 140° C., a press time of 25 seconds and a pressure of 0.2 kg/cm$^2$. The results of the performance measurements of the interior material 10 obtained are shown in Table 1.

Example 5

A spunbonded nonwoven fabric having a weight of 30.2 g/m$^2$ and a thickness of 0.445 mm was obtained which was composed of a conjugate fiber comprising PP as its core and PVB having a degree of butyralization of 72 mass % and an MFR of 2.0 g/10 min as its sheath. Using the resulting spunbonded nonwoven fabric as the adhering layer 6 as shown in FIG. 1, an interior material 10 was obtained by conducting press molding under the same composition as Example 1 and the same press conditions as Example 4. The results of the performance measurements of the interior material 10 obtained are shown in Table 1.

Example 6

Using a resin composition resulting from the mixing of PVB having a degree of butyralization of 77 mass % and an MFR of 6.0 g/10 min and an ethylene-octene copolymer ("ENGAGE 8402" produced by DuPont Dow Co.), and using a melt-blown nonwoven fabric having a weight of 30.0 g/m$^2$ and a thickness of 0.441 mm as the adhering layer 6 as shown in FIG. 1, an interior material 10 was obtained by conducting press molding under the same composition and conditions as Example 1. The results of the performance measurements of the interior material 10 obtained are shown in Table 1.

Comparative Example 1

Figure 2:
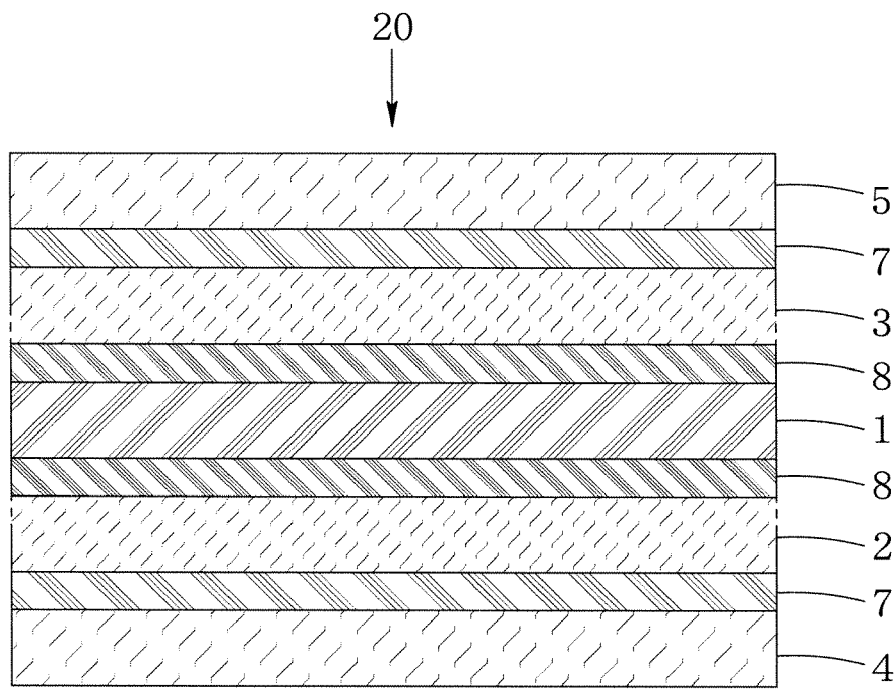
FIG. 2 is a sectional view showing one example of a conventional interior material.

An interior material 20 in which layers are laminated in the constitution shown in FIG. 2 was prepared in the following way. As adhering layers 8 for adhering a foam layer 1 made of a polyether-based hard urethane foam having a weight of 180 g/m$^2$ and a thickness of 6 mm and glass fiber layers 2, 3 (weight: 100 g/m$^2$; fiber length: 20 mm), 60 g/m$^2$ of an isocyanate resin was used. As an adhering layer 7 for adhering the glass fiber layer 3 and a surface material 5 on the rear side of the interior material made of a polyester fiber nonwoven fabric having a weight of 25 g/m$^2$, a hot-melt polyurethane sheet having a weight of 30 g/m$^2$ and a thickness of 0.250 mm ("Dow 909" produced by DuPont Dow Co.) was used. The "Dow 909" was used also as an adhering layer 7 for adhering the glass fiber layer 2 and a surface material 4 on the front side of the interior material made of a polyester fiber nonwoven fabric having a weight of 220 g/m$^2$. The interior material 20 was obtained by laminating these materials and conducting pressing under conditions: a press temperature of 150° C., a press time of 30 seconds and a press pressure of 0.3 g/cm$^2$. The results of the performance measurements of the interior material 20 obtained are shown in Table 2.

Comparative Example 2

An interior material 10 was obtained by conducting press molding under the same composition and conditions as Example 1 using, as the adhering layer 6, a spider web-like spunbonded nonwoven fabric ("Dynac G0030" produced by Toyobo Co., Ltd.) having a weight of 30.0 g/m$^2$ and a thickness of 0.230 mm made of a modified polyester fiber. The results of the performance measurements of the interior material 10 obtained are shown in Table 2.

Comparative Example 3

A melt-blown nonwoven fabric ("EO-MB" produced by Kuraray Co., Ltd.) having a weight of 30.7 g/m$^2$ and a thickness of 0.228 mm was obtained by using only an ethylene-octene copolymer having an MFR at 150° C. of 20 g/10 min ("ENGAGE 8402" produced by DuPont Dow Co.). Using the resulting melt-blown nonwoven fabric as the adhering layer 6, an interior material 10 was obtained by conducting press molding under the same composition and conditions as Example 1. The results of the performance measurements of the interior material 10 obtained are shown in Table 2.

Comparative Example 4

A melt-blown nonwoven fabric ("Microflex (registered trademark)" produced by Kuraray Co., Ltd.) having a weight of 30.0 g/m$^2$ and a thickness of 0.310 mm was obtained by using a copolymerized polypropylene having an MFR at 190° C. of 700 g/10 min (non-molten at 150° C.). Using the resulting nonwoven fabric as the adhering layer 6, an interior material 10 was obtained by conducting press molding under the same composition and conditions as Example 1. The results of the performance measurements of the interior material 10 obtained are shown in Table 2.

TABLE 1

|  | Example 1 | Example 2 | Example 3 | Example 4 | Example 5 | Example 6 |
|---|---|---|---|---|---|---|
| Fiber constituting adhering layer (continuous fiber nonwoven fabric) | | | | | | |
| Polymer composition of fiber | PVB | PVB | PVB | PVB | Core/sheath = PP/PVB | PVB-ENGAGE Mixed fiber |
| Degree of butyralization of PVB fiber (mass %) | 77 | 77 | 82 | 72 | 72 | 77 |
| Constitution of continuous fiber nonwoven fabric | | | | | | |
| Form of continuous fiber nonwoven fabric | Melt-blown | Melt-blown | Melt-blown | Spunbonded | Spunbonded | Melt-blown |
| Weight of nonwoven fabric (g/m$^2$) | 30.0 | 25.0 | 30.0 | 31.2 | 30.2 | 30.0 |
| Thickness of nonwoven fabric (mm) | 0.448 | 0.420 | 0.438 | 0.451 | 0.445 | 0.441 |
| Conditions of production of interior material (laminate) | | | | | | |
| Press temperature (° C.) | 150 | 150 | 150 | 140 | 140 | 150 |
| Press time (sec) | 30 | 30 | 30 | 25 | 25 | 30 |
| Press pressure (kg/cm$^2$) | 0.3 | 0.3 | 0.3 | 0.2 | 0.2 | 0.3 |
| Constitution and properties of interior material (laminate) | | | | | | |
| Weight of interior material (laminate) (g/m$^2$) | 745.0 | 725.0 | 745.0 | 749.8 | 745.8 | 745.0 |
| Thickness of interior material (laminate) (mm) | 10.84 | 9.81 | 10.98 | 11.21 | 10.78 | 10.71 |
| Adhesion strength (N/15 mm) | 0.74 | 0.70 | 0.70 | 0.61 | 0.66 | 0.58 |
| Flexural modulus gradient (N/50 mm/cm) | 61 | 58 | 59 | 58 | 62 | 57 |
| Maximum bending load (N/50 mm) | 17.8 | 17.1 | 17.6 | 17.8 | 18.1 | 17.4 |
| Degree of sound absorption (%) | 71 | 67 | 71 | 69 | 69 | 66 |
| Overall rating | A | A | A | A | A | A |

TABLE 2

|  | Comparative Example 1 | Comparative Example 2 | Comparative Example 3 | Comparative Example 4 |
|---|---|---|---|---|
| Constitution of adhering layer | | | | |
| Composition of adhering layer | Isocyanate resin and hot-melt polyurethane sheet | Spunbonded nonwoven fabric composed of modified polyester fibers*1 | Melt-blown nonwoven fabric composed of ENGAGE*2 | Melt-blown nonwoven fabric composed of PP fiber*3 |
| Weight of adhering layer (g/m$^2$) | 30.0 | 30.0 | 30.7 | 30.0 |
| Thickness of adhering layer (mm) | 0.250 | 0.230 | 0.228 | 0.310 |
| Conditions of production of interior material (laminate) | | | | |
| Press temperature (° C.) | 150 | 150 | 150 | 150 |
| Press time (sec) | 30 | 30 | 30 | 30 |
| Press pressure (kg/cm$^2$) | 0.3 | 0.3 | 0.3 | 0.3 |
| Constitution and properties of interior material (laminate) | | | | |
| Weight of interior material (laminate) (g/m$^2$) | 745.0 | 745.0 | 747.8 | 745.0 |
| Thickness of interior material (laminate) (mm) | 10.11 | 10.01 | 9.89 | 10.21 |
| Adhesion strength (N/15 mm) | 0.40 | 0.29 | 0.40 | 0.37 |
| Flexural modulus gradient (N/50 mm/cm) | 42 | 51 | 50 | 53 |
| Maximum bending load (N/50 mm) | 11.6 | 12.2 | 12.2 | 10.5 |
| Degree of sound absorption (%) | 58 | 64 | 54 | 56 |
| Overall rating | B | B | B | B |

*1"Dynac G0030" produced by Toyobo Co., Ltd.
*2"EO-MB" produced by Kuraray Co., Ltd.
*3"Microflex" produced by Kuraray Co., Ltd.

As shown in Table 1, when the continuous fiber nonwoven fabrics of Examples 1 to 6 using PVB having a degree of butyralization of 50 to 90 mass % and an MFR at 150° C. of 0.5 to 45 g/10 min are used as adhering layers, the resulting interior materials exhibit a peeling strength (adhesion strength) of 0.05 N/15 mm or more even under low temperature-low pressure press conditions, namely, at a press temperature of 170° C. or lower and a press pressure of 0.3 kg/cm$^2$, and degrees of sound absorption of 65% or more are successfully secured. Moreover, excellent modulus gradients and excellent maximum bending loads were exhibited.

On the other hand, as shown in Table 2, in Comparative Examples 1 to 4, the peeling strength is 0.05 N/15 mm or less, the rigidity as a laminate is insufficient and delamination easily occurs. In addition, the degrees of sound absorption are 65% or less and therefore the comfort with respect to sound absorbency was poor.

The invention claimed is:

1. A nonwoven fabric comprising a polyvinyl butyral fiber, wherein the polyvinyl butyral fiber comprises polyvinyl butyral having a degree of butyralization of 50 to 90 mass % and an MFR, measured at 150° C. and 2.16 kgf, of 0.5 to 45 g/10 min.

2. The nonwoven fabric according to claim 1, wherein the polyvinyl butyral fiber comprises a single-component fiber made only of polyvinyl butyral, a conjugate fiber comprising polyvinyl butyral as a component, or a mixed fiber comprising polyvinyl butyral as a component.

3. The nonwoven fabric according to claim 1, wherein the polyvinyl butyral fiber is a continuous fiber.

4. The nonwoven fabric according to claim 3, wherein the nonwoven fabric is a melt-blown nonwoven fabric having a weight of 1 to 100 g/m$^2$.

5. The nonwoven fabric according to claim 3, wherein the nonwoven fabric is a spunbonded nonwoven fabric having a weight of 5 to 200 g/m$^2$.

6. A laminate comprising a plurality of layers, wherein each of the layers is adhered to another via an adhering layer comprising the nonwoven fabric according to claim 1.

7. The laminate according to claim 6, wherein an inorganic fiber layer and another layer are adhered together via the adhering layer.

8. The laminate according to claim 7, wherein the inorganic fiber layer is a glass fiber layer.

9. The laminate according to claim 7, wherein the inorganic fiber layer, a foam layer and a surface material layer are adhered together via the adhering layer.

10. An interior material comprising the laminate according to claim 6.

* * * * *